F. C. JAMISON.
MULTIPLE BAKING PAN.
APPLICATION FILED DEC. 16, 1914.
1,186,991.
Patented June 13, 1916.
2 SHEETS—SHEET 2.
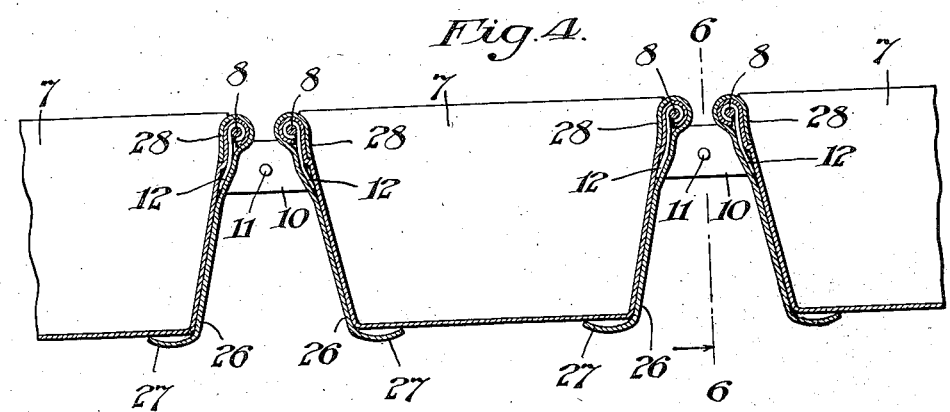
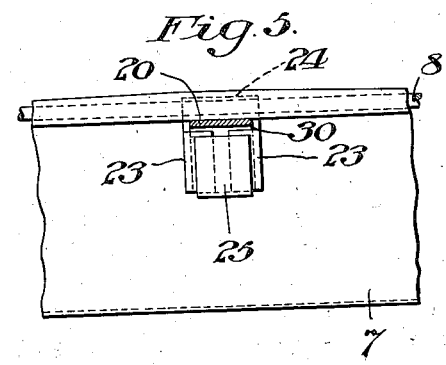
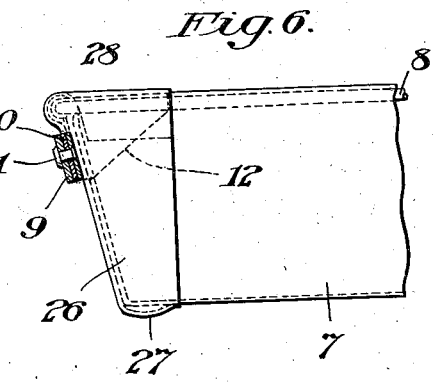
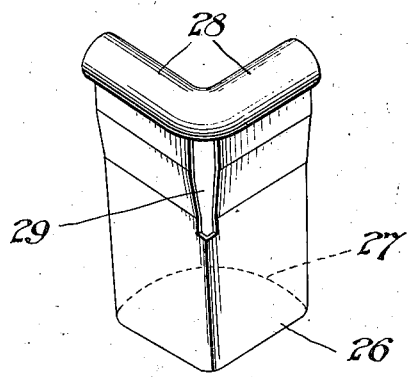
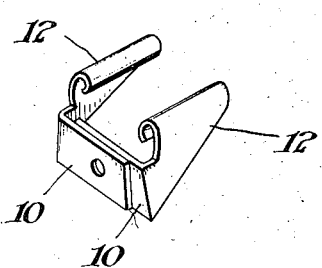
WITNESSES:
R. Schleicher
Jas. C. Nobwsmith
INVENTOR:
Frank C. Jamison,
BY
ATTORNEY

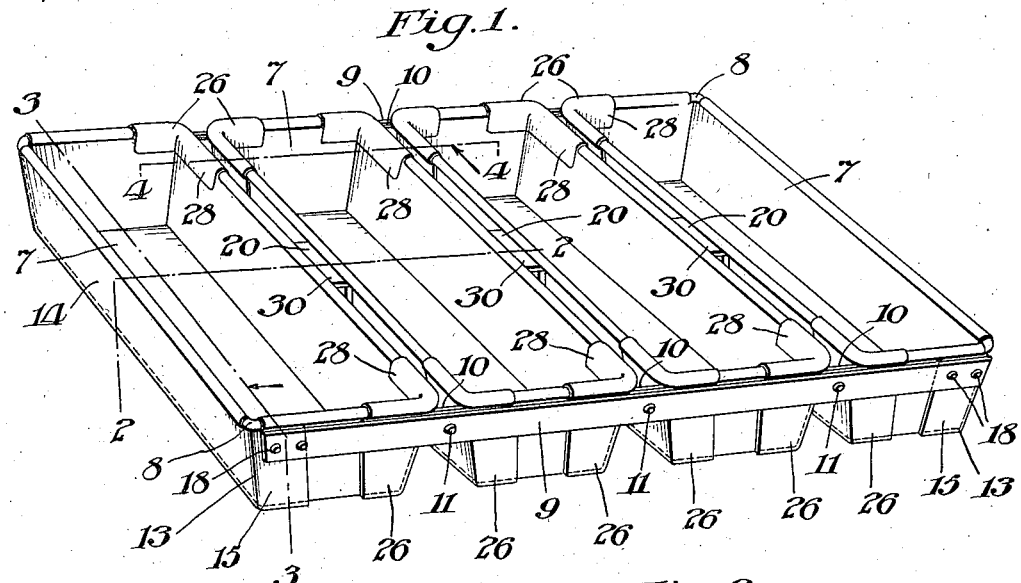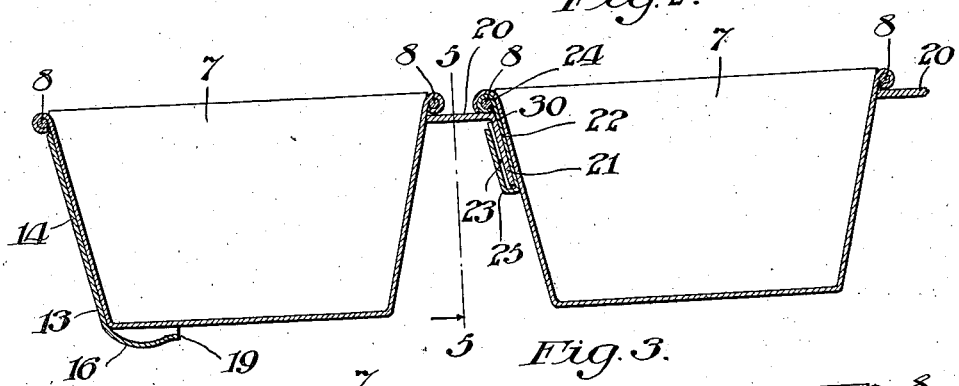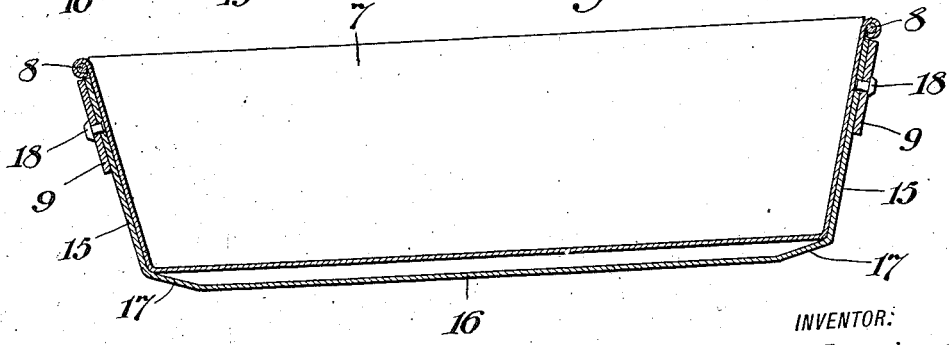

UNITED STATES PATENT OFFICE.

FRANK C. JAMISON, OF PHILADELPHIA, PENNSYLVANIA, ASSIGNOR TO WILLIAM F. HENIS, CHARLES G. HENIS, EDWARD HENIS, AND LOUISA JAMISON, ALL OF PHILADELPHIA, PENNSYLVANIA, COPARTNERS TRADING AS W. G. HENIS' SONS & CO.

MULTIPLE BAKING-PAN.

1,186,991.  Specification of Letters Patent.  Patented June 13, 1916.

Application filed December 16, 1914. Serial No. 877,458.

*To all whom it may concern:*

Be it known that I, FRANK C. JAMISON, a citizen of the United States, residing at Philadelphia, in the county of Philadelphia and State of Pennsylvania, have invented certain new and useful Improvements in Multiple Baking-Pans, of which the following is a specification.

The object of my invention is to provide a multiple baking pan of novel, simple and efficient construction, first, wherein the inner faces of the pans are free from rivets and smooth and unobstructed, secondly, wherein the corners, ends and bottoms of the multiple pan are protected, thirdly, wherein the different parts of the multiple pan are secured together and held in proper relation to each other in a novel and advantageous manner and, fourthly, wherein various novel and advantageous results are attained.

With this object in view, my improved pan consists of the elements and the construction, arrangement and combinations thereof hereinafter fully described and claimed.

In the accompanying drawings, illustrating my invention, Figure 1 is a perspective view of my improved multiple baking pan. Fig. 2 is a vertical section, on line 2—2 of Fig. 1. Fig. 3 is a vertical section, on line 3—3 of Fig. 1. Fig. 4 is a vertical section, on line 4—4 of Fig. 1. Fig. 5 is a vertical section, on line 5—5 of Fig. 2. Fig. 6 is a vertical section, on line 6—6 of Fig. 4. Fig. 7 is a perspective view of one of the guard members. Fig. 8 is a perspective view of two of the securing brackets.

Referring to the drawings, 7 designates a plurality of pans arranged side by side and spaced slightly from each other, as shown in Fig. 1. Each pan 7 is formed of sheet metal, in the usual manner; and each pan has a rectangular wire frame 8 surrounding the upper portion thereof and over and around which the metal forming the upper edge portions of the sides and ends of the pan are bent to secure them to the frame 8, as shown.

Extending throughout the plurality of pans 7 and arranged adjacent to the upper portions of the end walls thereof are two side bars 9. Two brackets 10 are secured to the inner sides of each bar 9 between each two adjacent pans 7, by means of a rivet 11. The brackets 10 are formed of sheet metal and each bracket has an arm 12 which extends inwardly and which is secured to the wire frame 8 of the adjacent pan 7 by being bent to embrace a part of the frame, as shown in Figs. 4 and 6.

Embracing the outer side of the outermost pan 7 at each end of the multiple pan is a guard member 13 comprising a body portion 14, end portions 15, a bottom portion 16 and inclined portions 17 at the ends of the bottom portion 16. The body portion 14 rests against the side of the adjacent pan 7 and the end portions 15 extend from the body portion 14 close to or in contact with the ends of the adjacent pan 7. The upper parts of the end portions 15 extend between the ends of the pan 7 and the ends of the bars 9 and are secured to the ends of the bars 9 by rivets 18. The bottom portion 16 extends from the body portion 14 and beneath the adjacent pan 7 in spaced relation to the bottom thereof, and the bottom portion 16 has free edge 19 spaced from the bottom of the pan, for purposes hereinafter explained. The inclined portions 17 are connected to the body portion 14 and they connect the ends of the bottom portion 16 with the lower ends of the end portions 15, the upper ends of the inclined portions 17 forming supports upon which the outer corners of the adjacent pan 7 rest, as shown in Fig. 3.

Embracing the inner corners of the two outermost pans 7 and each corner of the intermediate pans 7 are guard members 26. Each guard member 26 has a bottom portion 27 extending beneath the adjacent pan 7, and a top portion 28 extending over the top of the corner and the adjacent pan and down into the same, the body of the pan being forced outwardly where it is engaged on its interior by the inner part of the top portion 28 of the guard, so that the exposed face of the upper portion 28 of the corner guard which extends down into the pan 7 will lie flush with the inner surface of the metal forming the body of the pan to provide a smooth and unobstructed inner face for the pan, as shown in Fig. 4. The arms 12 of the securing brackets 10 are inclosed between the corner guard members 26 and the bodies of the pans 7, the brackets 10 penetrating the corner guards 26 or extending through openings 29 therein.

Each two adjacent pans 7, between the ends thereof and between the two bars 9 are maintained spaced from each other by a spacing device 30 which comprises an angle piece, having the horizontal part 20 and the downwardly-extending part 21; and a sheet metal piece having the body portion 22 the side wings 23, the top wing 24 and the bottom wing 25. The angle piece and sheet metal piece are secured together by bending the wings 23 and 25 of the latter to embrace the arm or part 21 of the former, as shown. The horizontal part 20 of the angle piece extends between the two adjacent pans 7 and maintains them spaced from each other, and the entire spacing device 30 is held in place and secured to the wire frame 8 of one of the two adjacent pans 7 by having the top wing 24 of the sheet metal part bent to embrace a part of the wire frame 8 of the pan, as clearly shown in Figs. 2 and 4.

It will be observed that both the top wings 24 of the spacing members 30 and the arms 12 of the brackets 10 which embrace the wire frames 8 of the pans 7 are themselves embraced by the metal forming the upper edge portions of the sides of the pans 7, so as to present smooth and unobstructed upper edges for the pans, and to increase the holding strength of the parts.

By constructing the bottom portions 16 of the end guards 13, as hereinbefore described, the bottoms of the pans 7 are supported above the surface upon which the end guards 13 of the multiple pan rest, permitting the free passage of air throughout the entire bottom surfaces of the pans 7, the air being free to pass into and from the spaces between the bottom portions 16 of the end guards 13 and the bottom surfaces of the pans above them, for the uniform heating of the bottom surfaces of the pans. In addition to this, the bottom portions 16 of the end guards 13 are free to spring slightly and form cushions when the usual peel is inserted between the multiple pan and its support for removing the multiple pan therefrom; and the inclined portions 17 permit the ready insertion of the peel.

I claim:

1. A baking pan having a guard member secured thereto, said guard member comprising a body portion covering one side of the pan, and a bottom portion extending from the body portion beneath the pan in spaced relation to the bottom thereof, the bottom portion having a free edge spaced from the bottom of the pan for the admission of air to the space between said bottom portion and the bottom of the pan and the bottom portion forming a spring movable upwardly toward the bottom of the pan.

2. A baking pan having a guard member secured thereto, said guard member comprising a body portion covering one side of the pan, end portions extending from the body portion and covering portions of the ends of the pan, and a bottom portion extending from the body portion beneath the pan in spaced relation to the bottom thereof, the bottom portion having a free edge spaced from the bottom of the pan for the admission of air to the space between said bottom portion and the bottom of the pan and the bottom portion forming a spring movable upwardly toward the bottom of the pan.

3. A baking pan having a guard member secured thereto, said guard member comprising a body portion covering one side of the pan, end portions extending from the body portion and covering portions of the ends of the pan, inclined portions extending downwardly from the end portions and beneath the pan, and a horizontal bottom portion extending from the body portion beneath the pan in spaced relation to the bottom thereof and connected to said inclined portions.

4. A baking pan having a guard member secured thereto, said guard member comprising a body portion covering one side of the pan, end portions extending from the body portion and covering portions of the ends of the pan, inclined portions extending downwardly from the end portions and beneath the pan, and a bottom portion extending from the body portion beneath the pan in spaced relation to the bottom thereof, the bottom portion being connected to said inclined portions and having a free edge spaced from the bottom of the pan for the admission of air to the space between said bottom portion and the bottom of the pan.

5. A multiple baking pan comprising a plurality of pans each having a wire frame extending around the upper portion thereof each having parts embracing the wire frames, connecting bars for the plurality of pans, brackets formed independently of the pans and having parts embracing the wire frames and means to secure the brackets to the connecting bars.

6. A multiple baking pan comprising a plurality of pans each having a wire frame extending around the upper portion thereof each having parts embracing the wire frames, connecting bars for the plurality of pans, and brackets formed independently of the pans and embracing the wire frames and riveted to the connecting bars.

7. A multiple baking pan comprising a plurality of pans each having a wire frame extending around the upper portion thereof each having parts embracing the wire frames, connecting bars for the plurality of pans, and brackets formed independently of the pans and projecting fixedly from the connecting bars and embracing the wire frames.

8. A multiple baking pan comprising a plurality of spaced pans each having a wire frame extending around the upper portion thereof and secured thereto, connecting bars secured to and connecting the spaced pans, and a spacing member between two adjacent pans and formed by an angle piece and a sheet metal piece embracing the angle piece and also embracing the wire frame of one of said two adjacent pans.

9. A multiple baking pan comprising a plurality of pans each having a wire frame extending around the upper portion thereof, and means for holding the plurality of pans in position relatively to each other, said means including a part embracing the wire frame of one pan, and said part being embraced by the upper edge portion of the metal forming the pan.

10. A multiple baking pan comprising a plurality of pans, connecting bars for the plurality of pans, corner guards on the pans, and brackets penetrating the corner guards and securing the pans to the connecting bars.

11. A multiple baking pan comprising a plurality of pans, connecting bars for the plurality of pans, guards embracing the corners of the pans and having their lower portions extending beneath the pans and their upper portions extending down into the pans, and brackets penetrating the guards and securing the pans to the connecting bars.

In testimony whereof I affix my signature in presence of two witnesses.

FRANK C. JAMISON.

Witnesses:
S. I. HARPER,
A. V. GROUPE.